US009188071B2

United States Patent
Sun et al.

(10) Patent No.: US 9,188,071 B2
(45) Date of Patent: Nov. 17, 2015

(54) SYSTEM AND METHOD FOR CONTROLLING AN ENGINE BASED ON AMMONIA STORAGE IN MULTIPLE SELECTIVE CATALYTIC REDUCTION CATALYSTS

(75) Inventors: Min Sun, Troy, MI (US); Kevin L. Perry, Fraser, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 805 days.

(21) Appl. No.: 13/471,861

(22) Filed: May 15, 2012

(65) Prior Publication Data
US 2013/0311065 A1   Nov. 21, 2013

(51) Int. Cl.
| | |
|---|---|
| F02D 41/02 | (2006.01) |
| F01N 9/00 | (2006.01) |
| F01N 3/20 | (2006.01) |
| F02D 41/14 | (2006.01) |

(52) U.S. Cl.
CPC .......... *F02D 41/0235* (2013.01); *F01N 3/2066* (2013.01); *F01N 9/00* (2013.01); *F02D 41/1475* (2013.01); *F01N 2560/026* (2013.01); *F01N 2560/06* (2013.01); *F01N 2560/07* (2013.01); *F02D 41/1445* (2013.01); *F02D 2200/0802* (2013.01); *Y02T 10/24* (2013.01); *Y02T 10/47* (2013.01)

(58) Field of Classification Search
CPC ... F01N 3/208; F01N 3/2066; F01N 2610/02; F01N 11/00; Y02T 10/24; F02D 41/0002; F02D 41/0025; F02D 41/30; F02D 29/02; F02D 41/1454

USPC .......... 701/101, 103, 104; 60/274, 276, 286, 60/301, 287, 285
See application file for complete search history.

(56) References Cited

U.S. PATENT DOCUMENTS

| | | | |
|---|---|---|---|
| 5,021,227 A | 6/1991 | Kobayashi et al. | |
| 5,746,052 A | 5/1998 | Kinugasa et al. | |
| 5,778,667 A | 7/1998 | Kinugasa et al. | |
| 5,782,087 A | 7/1998 | Kinugasa et al. | |
| 6,109,024 A | 8/2000 | Kinugasa et al. | |
| 6,119,452 A | 9/2000 | Kinugasa et al. | |

(Continued)

FOREIGN PATENT DOCUMENTS

| | | |
|---|---|---|
| CN | 101929374 A | 12/2010 |
| DE | 10041891 A1 | 4/2001 |

(Continued)

OTHER PUBLICATIONS

David Garrod, Ph.D., Esq.; "Glossary of Judicial Claim Constructions in the Electronics, Computer and Business Method Arts"; p. 257; © 2010; 2 pages.

(Continued)

*Primary Examiner* — Hai Huynh
*Assistant Examiner* — Raza Najmuddin

(57) ABSTRACT

A system according to the principles of the present disclosure includes a storage estimation module and an air/fuel ratio control module. The storage estimation module estimates a first amount of ammonia stored in a first selective catalytic reduction (SCR) catalyst and estimates a second amount of ammonia stored in a second SCR catalyst. The air/fuel ratio control module controls an air/fuel ratio of an engine based on the first amount, the second amount, and a temperature of a substrate disposed in the second SCR catalyst.

20 Claims, 4 Drawing Sheets

(56) References Cited

U.S. PATENT DOCUMENTS

Figure 1:
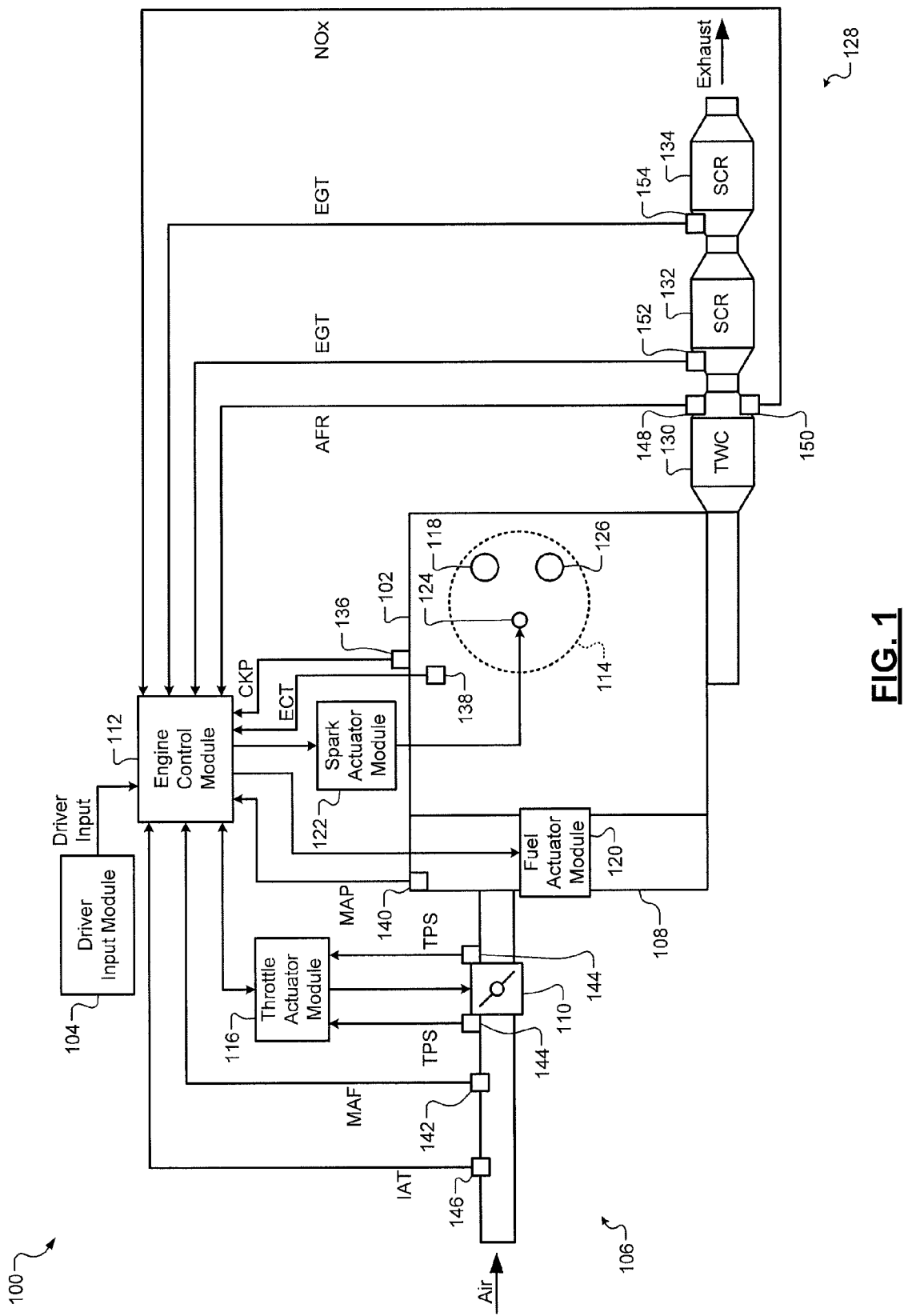

| | | | |
|---|---|---|---|
| 6,345,496 | B1 | 2/2002 | Fuwa et al. |
| 6,662,552 | B1 | 12/2003 | Gunther et al. |
| 6,775,623 | B2 | 8/2004 | Ali et al. |
| 7,210,288 | B2 | 5/2007 | Bandl-Konr |
| 7,472,545 | B2 | 1/2009 | Hemingway et al. |
| 7,628,009 | B2 | 12/2009 | Hu et al. |
| 7,673,444 | B2 | 3/2010 | Yano et al. |
| 8,005,605 | B2 | 8/2011 | Yasui |
| 8,041,498 | B2 | 10/2011 | Brown et al. |
| 8,393,140 | B2 * | 3/2013 | Perry et al. .................. 60/285 |
| 2002/0069640 | A1 | 6/2002 | Irisawa et al. |
| 2007/0033928 | A1 | 2/2007 | Hu et al. |
| 2007/0137182 | A1 | 6/2007 | Driscoll |
| 2007/0175208 | A1 | 8/2007 | Bandl-Konrad et al. |
| 2007/0271908 | A1 | 11/2007 | Hemingway et al. |
| 2009/0165442 | A1 | 7/2009 | Hara |
| 2009/0199543 | A1 | 8/2009 | Sawada et al. |
| 2010/0043402 | A1 | 2/2010 | Perry et al. |
| 2010/0057328 | A1 | 3/2010 | Brown et al. |
| 2010/0071347 | A1 | 3/2010 | Yoshida et al. |
| 2010/0107605 | A1 | 5/2010 | Brinkman et al. |
| 2010/0107606 | A1 * | 5/2010 | Narayanaswamy et al. .... 60/274 |
| 2010/0111794 | A1 * | 5/2010 | Katoh ..................... 423/239.1 |
| 2010/0192545 | A1 * | 8/2010 | Schmieg et al. ............... 60/286 |
| 2010/0326052 | A1 | 12/2010 | Sun |
| 2011/0041480 | A1 * | 2/2011 | Yasui et al. .................. 60/286 |
| 2012/0102927 | A1 * | 5/2012 | Hirota ........................ 60/287 |
| 2012/0117954 | A1 * | 5/2012 | Yasui et al. .................. 60/301 |
| 2012/0167553 | A1 | 7/2012 | Qi et al. |
| 2012/0180558 | A1 | 7/2012 | Li et al. |
| 2012/0222406 | A1 | 9/2012 | Sakurai et al. |
| 2012/0311998 | A1 | 12/2012 | Sun et al. |
| 2012/0316754 | A1 | 12/2012 | Narayanaswamy et al. |
| 2013/0025261 | A1 | 1/2013 | Sun et al. |
| 2013/0095002 | A1 | 4/2013 | In et al. |
| 2013/0311065 | A1 | 11/2013 | Sun et al. |
| 2014/0013725 | A1 | 1/2014 | Sun et al. |

FOREIGN PATENT DOCUMENTS

| | | |
|---|---|---|
| DE | 102009054046 A1 | 9/2010 |
| EP | 1061244 A2 | 12/2000 |

OTHER PUBLICATIONS

U.S. Appl. No. 13/157,669, filed Jun. 10, 2011, Sun et al.
U.S. Appl. No. 13/192,859, filed Jul. 28, 2011, Sun et al.
Office Action dated Oct. 18, 2013 from the German Patent Office for German Patent Application No. 10 2012 209 469.5; 7 pages.

* cited by examiner

SYSTEM AND METHOD FOR CONTROLLING AN ENGINE BASED ON AMMONIA STORAGE IN MULTIPLE SELECTIVE CATALYTIC REDUCTION CATALYSTS

STATEMENT OF GOVERNMENT RIGHTS

This invention was produced pursuant to United States Government Program No. DE-EE0003379 with the Department of Energy (DoE). The U.S. Government has certain rights in this invention.

FIELD

The present disclosure relates to systems and methods for controlling an engine based on ammonia storage in multiple selective catalytic reduction catalysts.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Three-way and selective catalytic reduction (SCR) catalysts reduce emissions in exhaust from an engine. When an air/fuel ratio of the engine is rich or stoichiometric, the three-way catalyst reduces hydrocarbon, carbon monoxide, and nitrogen oxide and produces ammonia, and the SCR catalyst stores the ammonia. When the air/fuel ratio is lean, the three-way catalyst reduces hydrocarbon and carbon monoxide, and the ammonia stored in the SCR catalyst is used to reduce nitrogen oxide. Thus, the amount of ammonia stored in the SCR catalyst decreases when the air/fuel ratio is lean.

Typically, the air/fuel ratio is adjusted to lean to improve fuel economy. Passive SCR systems may switch the air/fuel ratio from lean to rich to increase ammonia storage levels in the SCR catalyst. Active SCR systems inject a dosing agent, such as urea, into exhaust to increase ammonia storage levels in the SCR catalyst. The dosing agent breaks down to form ammonia that is stored in the SCR catalyst.

SUMMARY

A system according to the principles of the present disclosure includes a storage estimation module and an air/fuel ratio control module. The storage estimation module estimates a first amount of ammonia stored in a first selective catalytic reduction (SCR) catalyst and estimates a second amount of ammonia stored in a second SCR catalyst. The air/fuel ratio control module controls an air/fuel ratio of an engine based on the first amount, the second amount, and a temperature of a substrate disposed in the second SCR catalyst.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an example engine system according to the principles of the present disclosure;

FIG. 2 is a functional block diagram of an example control system according to the principles of the present disclosure;

FIG. 3 is a flowchart illustrating an example control method according to the principles of the present disclosure; and FIGS. 4 and 5 are graphs illustrating signals indicating operating conditions in a passive selective catalytic reduction (SCR) system according to the principles of the present disclosure.

DETAILED DESCRIPTION

The temperature of a selective catalytic reduction (SCR) catalyst affects the efficiency of reactions within the SCR catalyst that reduce nitrogen oxide and affects the ability of the SCR catalyst to store ammonia. When the temperature of a SCR catalyst is low, such as less than 144 degrees Celsius (° C.), the efficiency of reactions that reduce nitrogen oxide within the SCR catalyst approaches zero. Thus, even if the SCR catalyst contains ammonia, the ammonia does not react with and reduce nitrogen oxide. When the temperature of a SCR catalyst is high, such as greater than 400° C., the SCR catalyst is unable to store ammonia.

SCR systems typically include a three-way catalyst disposed downstream from an engine and an SCR catalyst disposed downstream from the three-way catalyst. The temperature of the SCR catalyst is affected by the distance between the engine and the SCR catalyst. The distance between the engine and an SCR catalyst that is disposed immediately downstream from a three-way catalyst may be relatively short. Therefore, the temperature of the SCR catalyst may be too low to effectively reduce nitrogen oxide only when the engine is initially started.

Some SCR systems may include two or more SCR catalysts disposed downstream from a three-way catalyst. The distance between the engine and an SCR catalyst that is disposed downstream from another SCR catalyst may be relatively long. Therefore, the temperature of the SCR catalyst may be too low to effectively reduce nitrogen oxide well after the engine is started. In addition, the efficiency of reactions within the SCR catalyst that reduce nitrogen oxide may not reach a peak efficiency until the engine is operating at a high load such as those experienced when a vehicle is driven on a highway.

A system and method according to the principles of the present disclosure estimates a first amount of ammonia stored in a first SCR catalyst and a second amount of ammonia stored in a second SCR catalyst. The second SCR catalyst is disposed downstream from the first SCR catalyst. The first and second amounts may be estimated based on the temperature of exhaust gas flowing through the SCR catalysts. A multiplier is determined based on the temperature of the second SCR catalyst. An effective amount of ammonia stored in the SCR catalysts is estimated based on a sum of the first amount and a product of the multiplier and the second amount. The effective amount represents the amount of ammonia that is effectively reduces nitrogen oxide.

The air/fuel ratio of an engine is controlled based on the effective amount of ammonia stored in the SCR catalysts. The air/fuel ratio of the engine may be adjusted to a rich air/fuel ratio when the effective amount is less than a first quantity. The air/fuel ratio of the engine may be adjusted to a lean air/fuel ratio when the effective amount is greater than a second quantity. The first and second quantities may be predetermined. The second quantity may be greater than or equal to the first quantity.

Estimating the amount of ammonia stored in the SCR catalysts based on the temperature of exhaust gas flowing through the SCR catalysts accounts for declines in the ability of the SCR catalysts to store ammonia at high temperatures. Estimating the effective amount of ammonia stored in the SCR catalysts using the multiplier accounts for reductions in the reaction efficiency of the second SCR catalyst at low temperatures. If more than one SCR catalyst is disposed downstream from another SCR catalyst, a multiplier may be applied to the estimated amount of ammonia stored in each SCR catalyst that is disposed downstream from another SCR catalyst.

Referring now to FIG. 1, an example implementation of an engine system 100 includes an engine 102 that combusts an air/fuel mixture to produce drive torque for a vehicle based on driver input from a driver input module 104. Air is drawn into the engine 102 through an intake system 106. For example only, the intake system 106 may include an intake manifold 108 and a throttle valve 110. For example only, the throttle valve 110 may include a butterfly valve having a rotatable blade. An engine control module (ECM) 112 controls a throttle actuator module 116, which regulates opening of the throttle valve 110 to control the amount of air drawn into the intake manifold 108.

Air from the intake manifold 108 is drawn into cylinders of the engine 102. While the engine 102 may include multiple cylinders, for illustration purposes a single representative cylinder 114 is shown. For example only, the engine 102 may include 2, 3, 4, 5, 6, 8, 10, and/or 12 cylinders. The ECM 112 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 114. Therefore, two crankshaft revolutions are necessary for the cylinder 114 to experience all four of the strokes.

During the intake stroke, air from the intake manifold 108 is drawn into the cylinder 114 through an intake valve 118. The ECM 112 controls a fuel actuator module 120, which regulates fuel injection to achieve a desired air/fuel ratio. Fuel may be injected into the intake manifold 108 at a central location or at multiple locations, such as near the intake valve 118 of each of the cylinders. In various implementations (not shown), fuel may be injected directly into the cylinders or into mixing chambers associated with the cylinders. The fuel actuator module 120 may halt injection of fuel to cylinders that are deactivated.

The injected fuel mixes with air and creates an air/fuel mixture in the cylinder 114. During the compression stroke, a piston (not shown) within the cylinder 114 compresses the air/fuel mixture. The engine 102 may be a compression-ignition engine, in which case compression in the cylinder 114 ignites the air/fuel mixture. Alternatively, the engine 102 may be a spark-ignition engine, in which case a spark actuator module 122 energizes a spark plug 124 in the cylinder 114 based on a signal from the ECM 112, which ignites the air/fuel mixture. The timing of the spark may be specified relative to the time when the piston is at its topmost position, referred to as top dead center (TDC).

The spark actuator module 122 may be controlled by a timing signal specifying how far before or after TDC to generate the spark. Because piston position is directly related to crankshaft rotation, operation of the spark actuator module 122 may be synchronized with crankshaft angle. In various implementations, the spark actuator module 122 may halt provision of spark to deactivated cylinders.

Generating the spark may be referred to as a firing event. The spark actuator module 122 may have the ability to vary the timing of the spark for each firing event. The spark actuator module 122 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 126. The byproducts of combustion are exhausted from the vehicle via an exhaust system 128.

The exhaust system 128 includes a three-way catalyst (TWC) 130 and selective catalytic reduction (SCR) catalysts 132, 134. When the air/fuel ratio of the engine 102 is rich or stoichiometric, the TWC 130 reduces hydrocarbon, carbon monoxide, and nitrogen oxide and produces ammonia, and the SCR catalysts 132, 134 store the ammonia. When the air/fuel ratio is lean, the TWC 130 reduces hydrocarbon and carbon monoxide, and the ammonia stored in the SCR catalysts 132, 134 is used to reduce nitrogen oxide.

The position of the crankshaft may be measured using a crankshaft position (CKP) sensor 136. The ECM 112 may determine the speed of the crankshaft (i.e., the engine speed) based on the crankshaft position. The temperature of the engine coolant may be measured using an engine coolant temperature (ECT) sensor 138. The ECT sensor 138 may be located within the engine 102 or at other locations where the coolant is circulated, such as a radiator (not shown).

The pressure within the intake manifold 108 may be measured using a manifold absolute pressure (MAP) sensor 140. In various implementations, engine vacuum, which is the difference between ambient air pressure and the pressure within the intake manifold 108, may be measured. The mass flow rate of air flowing into the intake manifold 108 may be measured using a mass air flow (MAF) sensor 142. In various implementations, the MAF sensor 142 may be located in a housing that also includes the throttle valve 110. The throttle actuator module 116 may monitor the position of the throttle valve 110 using one or more throttle position sensors (TPS) 144. The ambient temperature of air being drawn into the engine 102 may be measured using an intake air temperature (IAT) sensor 146.

An air/fuel ratio of exhaust gas from the engine 102 may be measured using an air/fuel ratio (AFR) sensor 148. Nitrogen oxide and ammonia levels in exhaust gas from the engine 102 may be measured using a nitrogen oxide (NOx) sensor 150. The AFR sensor 148 and the NOx sensor 150 may be positioned at or near the outlet of the TWC 130. The temperature of exhaust gas from the engine 102 may be measured using exhaust gas temperature (EGT) sensors 152, 154. The EGT sensor 152 may be disposed at or near the inlet of the SCR catalyst 132. The EGT sensor 154 may be disposed at or near the inlet of the SCR catalyst 134. The ECM 112 may use signals from the sensors to make control decisions for the engine system 100.

The ECM 112 estimates a first amount of ammonia stored in the SCR catalyst 132 and a second amount of ammonia stored in the SCR catalyst 134. The ECM 112 may estimate the first amount, the second amount, and a temperature of a substrate disposed in the SCR catalyst 134 based on input from the EGT sensors 152, 154. The ECM 112 may determine a multiplier based on the substrate temperature and estimate an effective amount of ammonia stored in the SCR catalysts 132, 134 based on a sum of the first amount and a product of the multiplier and the second amount.

The ECM 112 controls the air/fuel ratio of the engine 102 based on the effective amount of ammonia stored in the SCR catalysts 132, 134. The ECM 112 may adjust the air/fuel ratio of the engine 102 to a rich air/fuel ratio when the effective amount is less than a first quantity. The ECM 112 may adjust the air/fuel ratio of the engine 102 to a lean air/fuel ratio when the effective amount is greater than a second quantity. The first quantity and the second quantity may be predetermined, and the second quantity may be greater than or equal to the first quantity.

Figure 2:
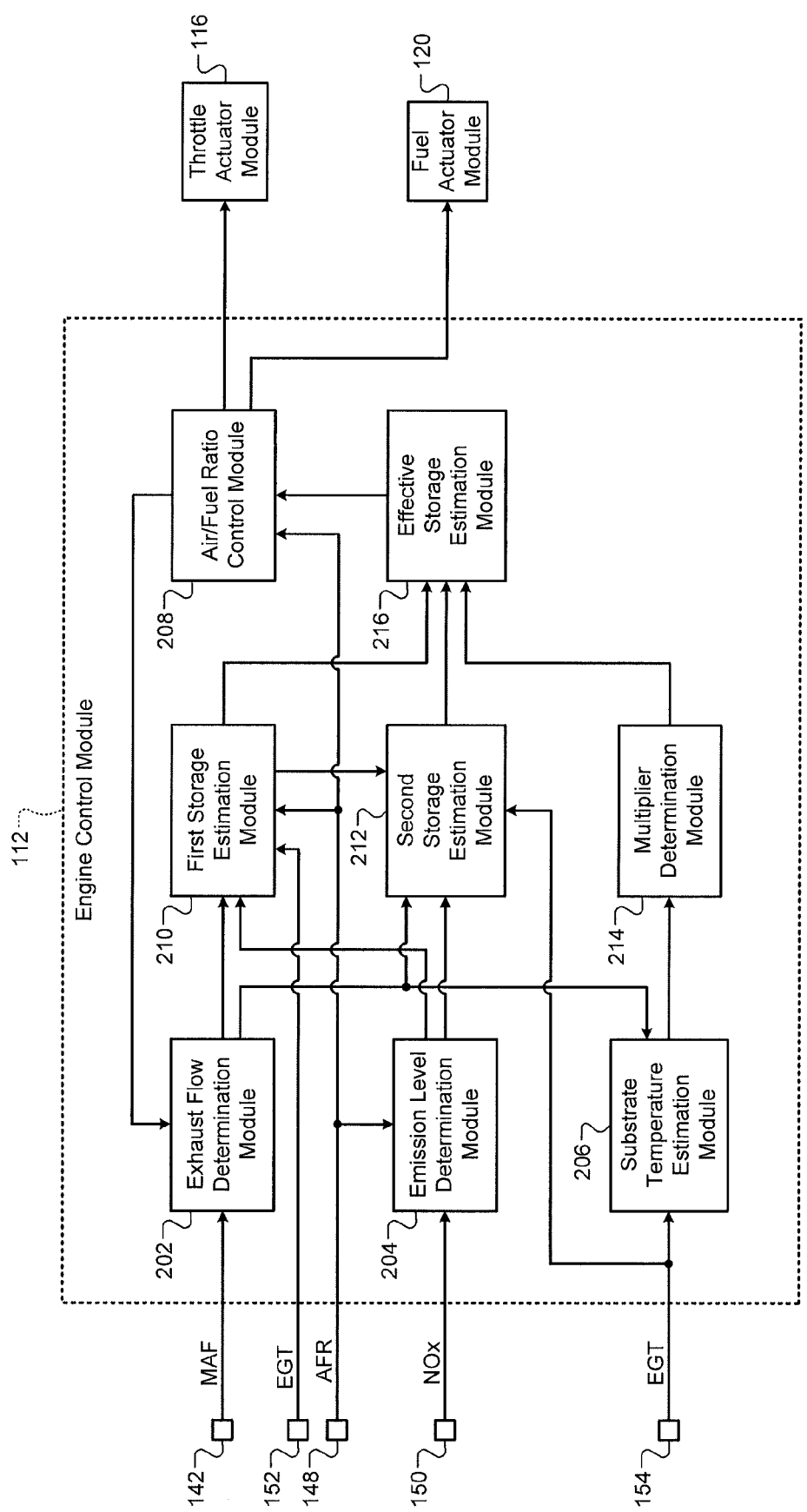

Referring now to FIG. 2, an example implementation of the ECM 112 includes an exhaust flow determination module 202, an emission level determination module 204, and a substrate temperature estimation module 206. The exhaust flow determination module 202 determines a mass flow rate of exhaust gas from the engine 102 based on a mass flow rate of air entering the engine 102 and a fueling rate of the engine 102. The exhaust flow determination module 202 may receive the mass flow rate of air from the MAF sensor 142. The exhaust flow determination module 202 may receive the fueling rate from an air/fuel ratio control module 208. The exhaust flow determination module 202 outputs the mass flow rate of exhaust gas.

The emission level determination module 204 determines emission levels in exhaust gas at the outlet of the TWC 130. When the air/fuel ratio of the engine 102 is lean, the emission level determination module 204 may set the ammonia level to zero and determine the nitrogen oxide level based on input from the NOx sensor 150. When the air/fuel ratio of the engine 102 is rich or stoichiometric, the emission level determination module 204 may set the nitrogen oxide level to zero and determine the ammonia level based on input from the NOx sensor 150. The emission level determination module 204 may determine the air/fuel ratio of the engine 102 based on input from the AFR sensor 148. The emission level determination module 204 outputs the emission levels.

The substrate temperature estimation module 206 estimates the temperature of the substrate disposed in the SCR catalyst 134. The substrate temperature estimation module 206 may estimate the substrate temperature based on the temperature of exhaust gas entering the SCR catalyst 134 and the mass flow rate of exhaust gas flowing through the SCR catalyst 134. The substrate temperature estimation module 206 may receive the exhaust gas temperature and mass flow rate from the EGT sensor 154 and the exhaust flow determination module 202, respectively. The substrate temperature estimation module 206 outputs the substrate temperature.

A first storage estimation module 210 estimates a first amount of ammonia stored in the SCR catalyst 132. The first storage estimation module 210 may estimate the first amount based on the temperature of exhaust gas entering the SCR catalyst 132, the mass flow rate of exhaust gas flowing through the SCR catalyst 132, and an air/fuel ratio of the engine 102. The first storage estimation module 210 may receive the exhaust gas temperature, the mass flow rate of exhaust gas, and the air/fuel ratio from the EGT sensor 152, the exhaust flow determination module 202, and the AFR sensor 148, respectively.

The first storage estimation module 210 may also estimate the first amount based on nitrogen oxide and ammonia levels in exhaust gas at the outlet of the TWC 130. The first storage estimation module 210 may receive the nitrogen oxide and ammonia levels from the emission level determination module 204. The first storage estimation module 210 outputs the first amount. The first storage estimation module 210 may estimate and output the nitrogen oxide and ammonia levels in exhaust gas exiting the SCR catalyst 132.

A second storage estimation module 212 estimates a second amount of ammonia stored in the SCR catalyst 134. The second storage estimation module 212 may estimate the second amount based on the temperature of exhaust gas entering the SCR catalyst 134, the mass flow rate of exhaust gas flowing through the SCR catalyst 134, and an air/fuel ratio of the engine 102. The second storage estimation module 212 may receive the exhaust gas temperature, the mass flow rate of exhaust gas, and the air/fuel ratio from the EGT sensor 154, the exhaust flow determination module 202, and the AFR sensor 148, respectively.

The second storage estimation module 212 may also estimate the second amount based on nitrogen oxide and ammonia levels in exhaust gas exiting the SCR catalyst 132. The second storage estimation module 212 may receive the nitrogen oxide and ammonia levels from the first storage estimation module 210. The second storage estimation module 212 outputs the second amount.

A multiplier determination module 214 determines a multiplier based on the substrate temperature. The multiplier determination module 214 may set the multiplier equal to zero when the substrate temperature is less than a first temperature (e.g., 150° C.). The multiplier determination module 214 may set the multiplier equal to one when the substrate temperature is greater than a second temperature (e.g., a temperature between 200° C. and 250° C., inclusive). The first temperature and the second temperature may be predetermined. The multiplier determination module 214 may adjust the multiplier in a linear or nonlinear manner as the substrate temperature transitions between the first temperature and the second temperature.

An effective storage estimation module 216 estimates an effective amount of ammonia stored in the SCR catalysts 132, 134 based on the first amount, the second amount, and the multiplier. The effective amount represents the amount of ammonia stored in the SCR catalysts 132, 134 that effectively reduces nitrogen oxide. The effective storage estimation module 216 may set the effective amount equal to a sum of the first amount and a product of the multiplier and the second amount. The effective storage estimation module 216 outputs the effective amount The air/fuel ratio control module 208 controls the air/fuel ratio based on the effective amount of ammonia stored in the SCR catalysts 132, 134. The air/fuel ratio control module 208 may adjust the air/fuel ratio to a rich air/fuel ratio when the effective amount is less than a first quantity. The air/fuel ratio control module 208 may adjust the air/fuel ratio to a lean air/fuel ratio when the effective amount is greater than a second quantity. The first quantity and the second quantity may be predetermined, and the second quantity may be greater than or equal to the first quantity.

The air/fuel ratio control module 208 may control the air/fuel ratio based on other engine operating conditions such as engine speed, engine torque, air/fuel ratio, and SCR catalyst temperature. The air/fuel ratio control module 208 may determine the engine speed based on input from the CKP sensor 136. The air/fuel ratio control module 208 may estimate the temperature of the SCR catalysts 132, 134 based on input from the EGT sensors 152, 154, respectively, and the mass flow rate of exhaust gas. The air/fuel ratio control module 208 controls the air/fuel ratio of the engine 102 by outputting signals to the throttle actuator module 116 and the fuel actuator module 120 indicating a desired throttle area and a desired fueling rate, respectively.

Figure 3:
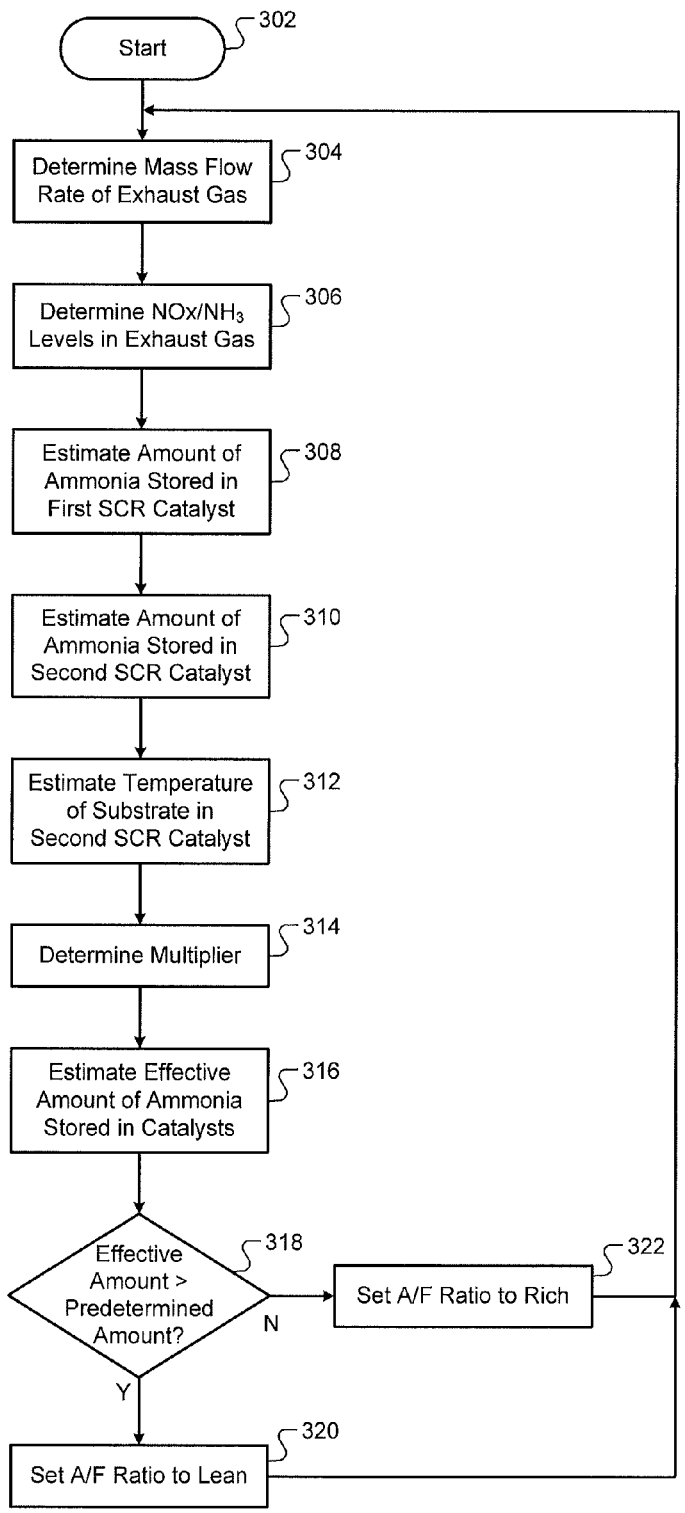

Referring now to FIG. 3, a method for controlling an engine based on ammonia storage in multiple SCR catalysts begins at 302. At 304, the method determines a mass flow rate of exhaust gas from the engine. The method may determine the mass flow rate of exhaust gas based on a sum of a mass flow rate of air entering the engine and a fueling rate of the engine.

At 306, the method determines nitrogen oxide and ammonia levels in exhaust gas. When the air/fuel ratio of the engine is lean, the method may set the ammonia level to zero and determine the nitrogen oxide level based on input from a NOx sensor. When the air/fuel ratio of the engine is rich or stoichiometric, the method may set the nitrogen oxide level to zero and determine the ammonia level based on input from the NOx sensor. The air/fuel ratio of the engine may be measured.

At 308, the method estimates a first amount of ammonia stored in a first SCR catalyst. The first SCR catalyst may be disposed downstream from a three-way catalyst. The method may estimate the first amount based on the mass flow rate of exhaust gas, the air/fuel ratio of the engine, the nitrogen oxide and ammonia levels, and the temperature of exhaust gas entering the first SCR catalyst. The temperature of exhaust gas entering the first SCR catalyst may be measured or estimated.

At 310, the method estimates a second amount of ammonia stored in a second SCR catalyst that is disposed downstream from the first SCR catalyst. The method may estimate the second amount based on the mass flow rate of exhaust gas, the air/fuel ratio of the engine, the nitrogen oxide and ammonia levels, and the temperature of exhaust gas entering the second SCR catalyst. The temperature of exhaust gas entering the second SCR catalyst may be measured or estimated.

At 312, the method estimates the temperature of a substrate disposed in the second SCR catalyst. The method may estimate the substrate temperature based on the temperature of exhaust gas entering the second SCR catalyst and the mass flow rate of exhaust gas. The method may increase the rate at which the substrate temperature is adjusted in response to a change in the temperature of exhaust gas when the mass flow rate of exhaust gas increases.

At 314, the method determines a multiplier based on the substrate temperature. The method may set the multiplier equal to zero when the substrate temperature is less than a first temperature (e.g., 150° C.). The method may set the multiplier equal to one when the substrate temperature is greater than a second temperature (e.g., 200° C.). The first and second temperatures may be predetermined. The method may adjust the multiplier in a linear or nonlinear manner as the substrate temperature transitions between the first temperature and the second temperature.

At 316, the method estimates an effective amount of ammonia stored in the first catalyst and the second catalyst. The effective amount represents the amount of ammonia stored in the first and second SCR catalysts that effectively reduces nitrogen oxide. The method may determine a product of the multiplier and the second amount, and then set the effective amount equal to a sum of the first amount and the product.

At 318, the method determines whether the effective amount is greater than a predetermined amount. If the effective amount is greater than a predetermined amount, the method continues to 320 and sets the air/fuel ratio of the engine to a lean air/fuel ratio. Otherwise, the method continues at 322 and sets the air/fuel ratio of the engine to a rich air/fuel ratio.

Figure 4:
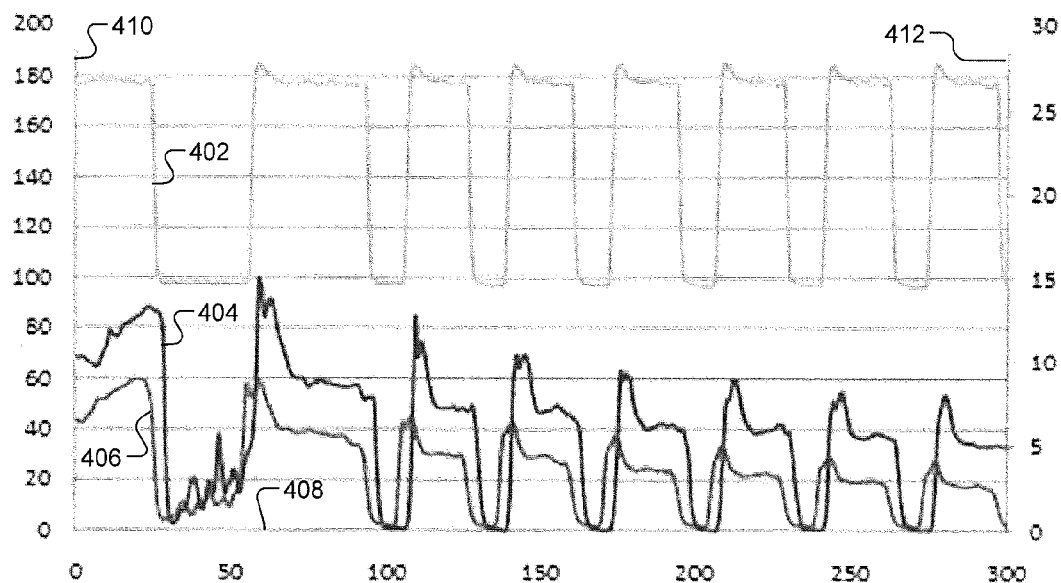

Referring now to FIG. 4, an AFR signal 402, a first NOx signal 404, and a second NOx signal 406 are illustrated. The AFR signal 402 indicates an air/fuel ratio at the outlet of a three-way catalyst disposed in an exhaust system of an engine. The first NOx signal 404 indicates a first NOx level at the outlet of a first SCR catalyst disposed downstream from the three-way catalyst. The second NOx signal 406 indicates a second NOx level downstream from a second SCR catalyst in a tailpipe of the exhaust system. The second SCR catalyst is disposed downstream from the first SCR catalyst.

The first NOx signal 404 and the second NOx signal 406 are plotted with respect to an x-axis 408 and a first y-axis 410. The x-axis 408 indicates time in seconds. The first y-axis 410 represents emissions levels in parts per million (ppm). The AFR signal 402 is plotted with respect to the x-axis 408 and a second y-axis 412.

The AFR signal 402 continuously cycles between a lean air/fuel ratio and a rich air/fuel ratio. The AFR signal 402 is stoichiometric when the AFR signal 402 is approximately equal to 14.7, the AFR signal 402 is rich when the AFR signal 402 is less than 14.7, and the AFR signal 402 is lean when the AFR signal 402 is greater than 14.7. The AFR signal 402 is rich for approximately one-third of the illustrated period, and the AFR signal 402 is lean for approximately two-thirds of the illustrated period.

The difference between the first NOx signal 404 and the second NOx signal 406 indicates the amount of nitrogen oxide reduced in the second SCR catalyst. This difference is approximately zero when the AFR signal 402 is rich, as the amount of nitrogen oxide at the outlet of the three-way catalyst is approximately zero when the AFR signal 402 is rich. The first SCR catalyst and the second SCR catalyst achieve a NOx reduction efficiency of approximately 80 percent when the AFR signal 402 is lean.

Figure 5:
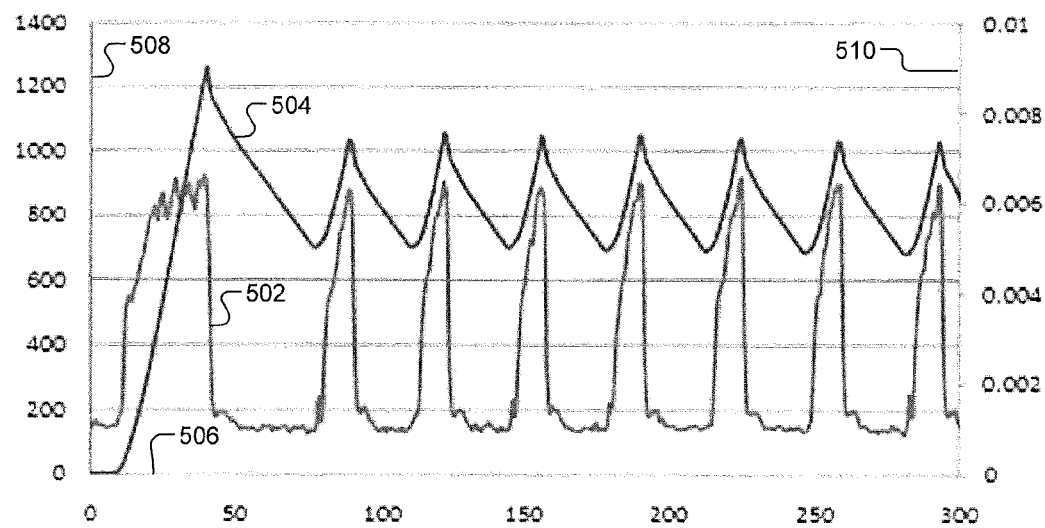

Referring now to FIG. 5, a NOx sensor signal 502 and an ammonia storage signal 504 are illustrated. The NOx sensor signal 502 indicates nitrogen oxide and ammonia levels at the outlet of a three-way catalyst disposed in an exhaust system of an engine. The ammonia storage signal 504 indicates an estimated amount of ammonia stored in a first SCR catalyst and a second SCR catalyst. The first SCR catalyst is disposed downstream from the three-way catalyst. The second SCR catalyst is disposed downstream from the first SCR catalyst.

The NOx sensor signal 502 is plotted with respect to an x-axis 506 and a first y-axis 508. The x-axis 506 indicates time in seconds. The first y-axis 508 represents emissions levels in parts per million (ppm). The ammonia storage signal 504 is plotted with respect to the x-axis 506 and a second y-axis 510. The second y-axis 510 represents ammonia storage in moles.

The NOx sensor signal 502 indicates nitrogen oxide levels when the air/fuel ratio of the engine is lean, and the NOx sensor signal indicates ammonia levels when the air/fuel ratio is rich or stoichiometric. The amount of ammonia produced in the three-way catalyst when the air/fuel ratio is rich or stoichiometric is greater than the amount of nitrogen oxide produced by the engine when the air/fuel ratio is lean. Thus, the NOx sensor signal 502 increases when the air/fuel ratio is switched from lean to rich.

The air/fuel ratio of the engine is switched between rich and lean to maintain the ammonia storage signal 504 within a desired range. The air/fuel ratio of the engine is adjusted to rich when the ammonia storage signal 504 is less than approximately 0.005 moles. The air/fuel ratio of the engine is adjusted to lean when the ammonia storage signal 504 is greater than approximately 0.007 moles.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   a storage estimation module that estimates a first amount of ammonia stored in a first selective catalytic reduction (SCR) catalyst and that estimates a second amount of ammonia stored in a second SCR catalyst;
   a substrate temperature estimation module that estimates a temperature of a substrate disposed in the second SCR catalyst based on a temperature of exhaust gas entering the second SCR catalyst and a mass flow rate of exhaust gas flowing through the second SCR catalyst; and
   an air/fuel ratio control module that controls an air/fuel ratio of an engine based on the first amount, the second amount, and the temperature of the substrate disposed in the second SCR catalyst.

2. The system of claim 1, wherein the storage estimation module estimates the first amount based on a temperature of exhaust gas entering the first SCR catalyst, an air/fuel ratio of exhaust gas entering the first SCR catalyst, and a mass flow rate of exhaust gas flowing through the first SCR catalyst.

3. The system of claim 1, wherein the storage estimation module estimates the second amount based on a temperature of exhaust gas entering the second SCR catalyst and a mass flow rate of exhaust gas flowing through the second SCR catalyst.

4. The system of claim 1, wherein the storage estimation module estimates the first amount and the second amount based on input received from a nitrogen oxide sensor disposed upstream from the first SCR catalyst.

5. The system of claim 1, further comprising a multiplier determination module that determines a multiplier based on the temperature of the substrate, wherein the air/fuel ratio control module controls the air/fuel ratio of the engine based on the multiplier.

6. The system of claim 5, wherein the multiplier is equal to zero when the temperature of the substrate is less than a first temperature and the multiplier is equal to one when the temperature of the substrate is greater than a second temperature.

7. The system of claim 6, wherein the first temperature is approximately 144 degrees Celsius and the second temperature is approximately 200 degrees Celsius.

8. The system of claim 5, wherein the air/fuel ratio control module controls the air/fuel ratio of the engine based on a product of the multiplier and the second amount.

9. The system of claim 8, wherein the air/fuel ratio control module controls the air/fuel ratio of the engine based on a sum of the first amount and the product.

10. The system of claim 9, wherein the air/fuel ratio control module adjusts the air/fuel ratio of the engine to a rich air/fuel ratio when the sum is less than a first quantity and adjusts the air/fuel ratio of the engine to a lean air/fuel ratio when the sum is greater than a second quantity.

11. A method comprising:
    estimating a first amount of ammonia stored in a first selective catalytic reduction (SCR) catalyst and that estimates a second amount of ammonia stored in a second SCR catalyst;
    estimating a temperature of a substrate disposed in the second SCR catalyst based on a temperature of exhaust gas entering the second SCR catalyst and a mass flow rate of exhaust gas flowing through the second SCR catalyst; and
    controlling an air/fuel ratio of an engine based on the first amount, the second amount, and the temperature of the substrate disposed in the second SCR catalyst.

12. The method of claim 11, further comprising estimating the first amount based on a temperature of exhaust gas entering the first SCR catalyst, an air/fuel ratio of exhaust gas entering the first SCR catalyst, and a mass flow rate of exhaust gas flowing through the first SCR catalyst.

13. The method of claim 11, further comprising estimating the second amount based on a temperature of exhaust gas entering the second SCR catalyst and a mass flow rate of exhaust gas flowing through the second SCR catalyst.

14. The method of claim 11, further comprising estimating the first amount and the second amount based on input received from a nitrogen oxide sensor disposed upstream from the first SCR catalyst.

15. The method of claim 11, further comprising determining a multiplier based on the temperature of the substrate and controlling the air/fuel ratio of the engine based on the multiplier.

16. The method of claim 15, wherein the multiplier is equal to zero when the temperature of the substrate is less than a first temperature and the multiplier is equal to one when the temperature of the substrate is greater than a second temperature.

17. The method of claim 16, wherein the first temperature is approximately 144 degrees Celsius and the second temperature is approximately 200 degrees Celsius.

18. The method of claim 15, further comprising controlling the air/fuel ratio of the engine based on a product of the multiplier and the second amount.

19. The method of claim 18, further comprising controlling the air/fuel ratio of the engine based on a sum of the first amount and the product.

20. The method of claim 19, further comprising adjusting the air/fuel ratio of the engine to a rich air/fuel ratio when the sum is less than a first quantity and adjusting the air/fuel ratio of the engine to a lean air/fuel ratio when the sum is greater than a second quantity.

* * * * *